July 18, 1961 — M. H. PAUL — 2,992,472
TOOL HOLDING MEANS
Filed May 22, 1958
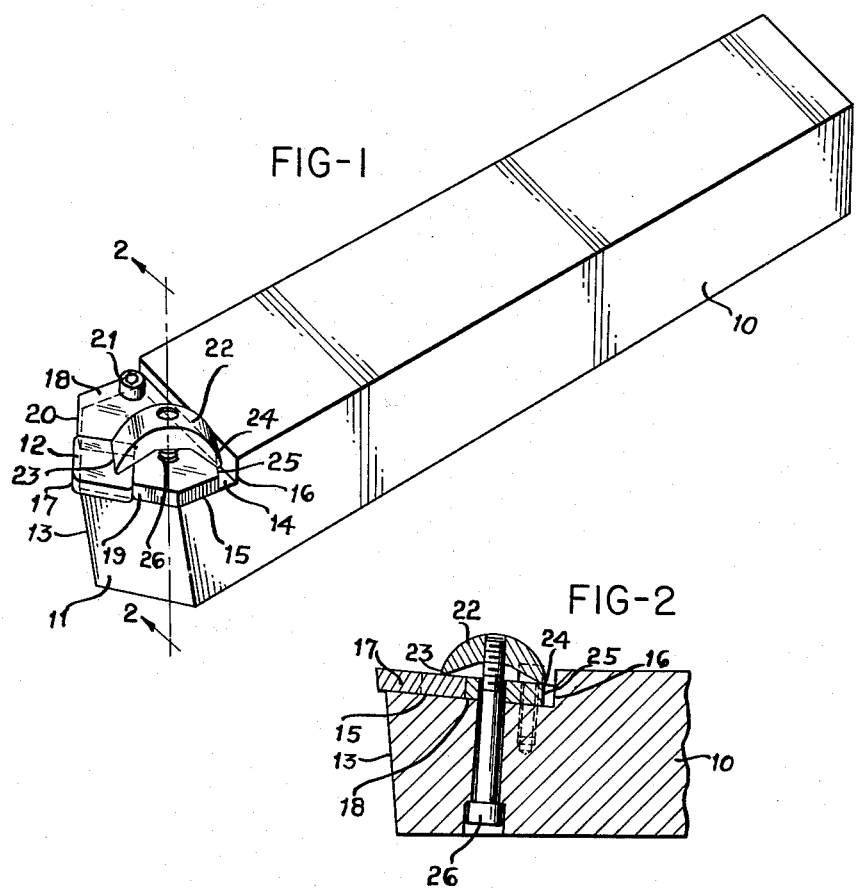
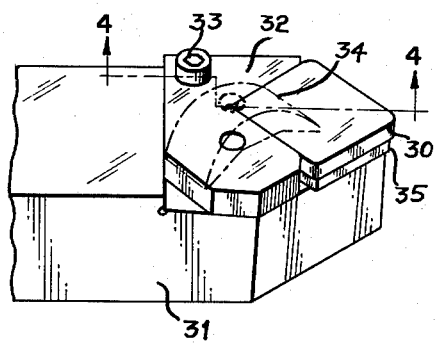
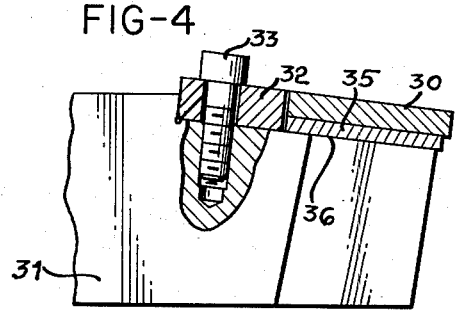
INVENTOR.
MERCER H. PAUL
BY
ATTORNEYS

United States Patent Office 2,992,472
Patented July 18, 1961

2,992,472
TOOL HOLDING MEANS
Mercer H. Paul, 316 Alicia Road, Dayton 17, Ohio, assignor of one-half to Aurel Vaszin, Dayton, Ohio
Filed May 22, 1958, Ser. No. 737,080
1 Claim. (Cl. 29—96)

This invention relates to means for holding cutting tool bits, and particularly relates to such means in which a replaceable cutting element is removably secured to a tool holder by intermediate engaging means.

A number of different types of devices have been used in the past for securing cutting tool bits to tool holders in such manner as to permit replacement when the cutting tool becomes worn. The present invention provides an improved means for removably securing a cutting tool bit to a tool holder, said means being simple, inexpensive and effective. Moreover, the present invention provides for adapting a tool holder for use with a plurality of different cutting bits of different shapes.

In the present invention, the body of a tool holder is provided with a cut-away portion for seating a tool bit and a tool bit-retaining member. The tool bit and tool bit-retaining member are held secured to the body of the tool holder by means of a clamp which engages both and is anchored in the body of the holder. Since the retaining member is of simple design, requiring no machining, it may readily be fabricated by inexpensive means, such as stamping.

Accordingly, an object of the invention is to provide a simple and effective means for removably securing a cutting tool bit to a tool holder.

Another object is to provide means for securing a cutting tool bit to a tool holder, which reans is of a configuration to permit its fabrication by relatively inexpensive means, such as stamping.

A further object is to provide means for securing a plurality of differently shaped cutting bits to a tool holder.

Other objects and advantages reside in the construction of parts, the combination thereof, the method of manufacture and the mode of operation, as will become more apparent from the following description.

In the drawings,

FIGURE 1 is a perspective view showing a cutting tool bit secured in operative position on a tool holder according to the teaching of the present invention;

FIGURE 2 is a sectional view taken along line 2—2 of FIGURE 1;

FIGURE 3 is a perspective view of another embodiment of the invention; and

FIGURE 4 is a sectional view taken along line 4—4 of FIGURE 3.

Referring to the drawings, FIGURE 1 shows a body 10 of a tool holder having one end formed by two bevelled surfaces 11 and 12 which intersect to form a straight line 13. This end of the body 10 is cut away at 14 in a manner which provides two surfaces 15 and 16 on the body, the surface 15 being slightly inclined from the horizontal, and the surface 16 being substantially perpendicular to the surface 15. The two surfaces 15 and 16 form a right dihedral angle.

The cut-away portion 14 forms a seat for a cutting tool bit 17, which, in the illustrated embodiment, is a four-cornered carborundum cutting tool bit, each of the four corners on both the upper side and the lower side being used for cutting. The bit 17 is retained in proper relationship to the body 10 by means of a retaining member 18 which is located on the surface 15 between the bit 17 and the surface 16, and which is provided with an angular cut-out portion to receive one corner of the bit 17. It may also be noted that surfaces 19 and 20 on the retaining member 18 are formed to complement the surfaces 11 and 12 of the body 10, so that the member 18 does not overhang the body 10, to eliminate any possible interference during a cutting operation.

Means are provided for holding the member 18 in position on the body 10, and may take the form of a screw 21 which threadedly engages an aperture in the body 10. This prevents movement of the member 18 relative to the body 10, and provides a firm seat for the tool bit 17.

The bit 17, in turn, is held in position on the body 10 by a clamping member 22 of crescent or arcuate configuration having two end portions 23 and 24, the portion 23 engaging the tool bit 17, while the portion 24 engages a surface 25 on the retaining member 18. The surface 25 is parallel to the end portion 24 on the arcuate clamping member 22 in their assembled relationship, so that said member 22 will grip the retaining member 18 and the bit 17 with maximum effect to secure them firmly with relation to each other and to the body 10. A threaded element 26 extends through apertures in the body 10 and the retaining member 18 and threadedly engages the clamping member 22 to provide the desired clamping action.

As may clearly be seen in FIGURE 2, the surface 15 is so inclined to the horizontal as to cause the bit 17 to project from the body 10 in an attitude of a few degrees above the horizontal, with the longitudinal axis of the holder being considered as the horizontal. This is generally referred to as a positive angle. It is obvious that this is purely exemplary, and that any appropriate inclination of the tool with respect to the holder, which is determined by the nature of the work to be performed, may be provided. For example, in FIGURES 3 and 4, a tool 30 is shown which projects from the body 31 of a tool holder at an angle which is a few degrees below the horizontal, with the longitudinal axis of the holder being considered as the horizontal. This is generally referred to as a negative angle.

The conbination shown in FIGURES 3 and 4 is generally the same as that shown in FIGURES 1 and 2, and includes the tool bit 30, the body 31 of the tool holder, a retaining member 32, a screw 33 for holding the retaining member in position, and an arcuate or crescent shaped clamping member 34, generally referred to as a strap clamp, shown in phantom in FIGURE 3. In addition, however, there is provided a shim 35, which is of the same general configuration as the bit 30, and of slightly smaller dimensions. This shim is seated between the tool 30 and a surface 36 on the body 31, and serves to raise the bit 30 to the proper elevation for cutting. The clamping member 34 clamps the tool bit 30 and the shim 35 firmly on the body 31 in a position determined by the configuration and dimensions of the retaining member 32.

It will be seen that in both illustrated embodiments, means are provided to clamp securely a cutting tool bit on a tool holder, while at the same time permitting easy and rapid replacement of one tool bit by another whenever a cutting tool becomes worn past the point of usefulness. It will also be seen that with the teaching of the present invention, a single tool holder may be used with bits of many different shapes and thicknesses, since all that is required to adapt a holder for a different bit is to provide a retaining member of the proper shape, together with a shim for changing the elevation of the bit, where necessary. The tool holder is easily and inexpensively produced, in that the two surfaces 15 and 16 extend across the tool holder without interruption. Also, of course, the shim may be one in which the upper and lower surfaces are nonparallel, to provide for different angles of inclination of the bit with respect to the holder.

As shown in the illustrated embodiment, the retaining member is simple in design and would require no complicated means of fabrication, but could be made very simply, as by stamping. This retaining member being seated on the surface 15 or 36, as the case may be, eliminates expensive tooling of complicated tool holders used in the past.

A very important advantage of this holder for cutting tools is the ease with which it may be repaired in the event it is damaged. In the past, a damaged bar is usually thrown away. If either of the surfaces 15 or 16 is damaged, it is merely necessary to put the bar 10 in a suitable machine to refinish the surface. That being the case, the bar has a much longer useful life than the conventional bars now in use.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A tool bit holding means comprising: in combination; a tool holding body having a tapered end, and a top surface, said top surface being recessed adjacent said end forming a shoulder extending across said surface joining said surface and the bottom of said recess at right angles thereto, said bottom presenting a flat, uninterrupted planar inclined seat extending from the top of said end to said shoulder and across the entire width of the body; a flat retaining member of substantially uniform thickness having a planar lower surface seated on and flatly engaging said inclined surface, said retaining member having a side in abutment with the shoulder, and a planar upper surface, a portion of said side being spaced from said shoulder to present a clamp-receiving edge adjacent the shoulder, a tool bit-receiving recess in the side of said retaining member opposite the side abutting the shoulder, said recess extending through the thickness of the retaining member; means clamping the retaining member in tight engagement with said inclined flat surface and said shoulder; a substantially crescent-shaped clamping element straddling said retaining member and having two mutually parallel end portions; and a threaded element extending through said body and said retaining member into said substantially crescent-shaped element for drawing said retaining member toward said body, one of said end portions engaging the top of a tool bit positioned in the tool bit-receiving recess and the other end portion of the crescent-shaped element engaging the clamping-receiving edge on the retaining member, to thus clamp the tool bit firmly in said recess and against said inclined surface.

References Cited in the file of this patent

UNITED STATES PATENTS

| | | |
|---|---|---|
| 2,425,242 | Herring | Aug. 5, 1947 |
| 2,675,604 | Plummer | Apr. 20, 1954 |
| 2,808,638 | Filippi | Oct. 8, 1957 |
| 2,870,523 | Richard | Jan. 27, 1959 |
| 2,887,760 | Armstrong | May 26, 1959 |

FOREIGN PATENTS

| | | |
|---|---|---|
| 1,140,048 | France | Feb. 25, 1957 |
| 129,886 | Great Britain | July 24, 1919 |
| 517,033 | Germany | Jan. 30, 1931 |

OTHER REFERENCES

Bulletin No. 552–M published by Wesson Co. 1220 Woodward Heights Blvd., Ferndale 20, Mich. Received in U.S. Patent Office Apr. 25, 1955. (4 pages)

Article, "Developments in Tools with Tungsten-carbide Throwaway Tips" from Machinery Magazine Nov. 18, 1955, vol. 87, pages 1199–1203. (5 pages)